Patented Dec. 11, 1951

2,578,207

UNITED STATES PATENT OFFICE 2,578,207

DI-(ALKYLPHENYL)-ALKENES

Herman Pines and Vladimir N. Ipatieff, Chicago, Ill., assignors to Universal Oil Products Company, Chicago, Ill., a corporation of Delaware No Drawing. Application June 16, 1949,
Serial No. 99,578

3 Claims. (Cl. 260—668)

This invention relates to di-(alkylphenyl)-alkenes and to a process for preparing the same.

This invention is based upon the discovery of a novel class of aromatic compounds containing olefinic unsaturation that may be reacted with chlorine to produce insecticides, that may be reacted with formaldehyde, and other aldehydes, to yield resins, and that may be employed as intermediates in the production of pharmaceuticals and dyes.

An object of this invention is to produce a di-(alkylphenyl)-alkene.

Another object of this invention is to produce 1-p-tolyl-1-(2-methyl-5-isobutylphenyl)-2-methyl-1-propene.

One specific embodiment of this invention relates to a di-(alkylphenyl)-alkene as a new composition of matter.

Another embodiment of this invention relates to a di-(alkylphenyl)-alkene having the general formula:

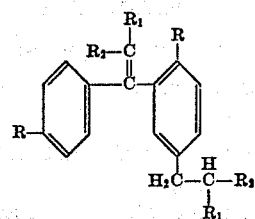

wherein R represents a straight chain alkyl group, and $R_1$ and $R_2$ are each separately and independently selected from an alkyl group and a cycloalkyl group.

A further embodiment of this invention relates to 1-p-tolyl-1-(2-methyl-5-isobutylphenyl)-2-methyl-1-propene.

The methods of synthesis that may be used for preparing these di-(alkylphenyl)-alkenes comprise these steps including halogenation of a benzene hydrocarbon to an aryl halide in which the halogen is preferably bromine or chlorine, and reaction of this aryl halide with an alkyl aryl ketone by the Grignard method to form a di-(alkylphenyl)-alkanol which is then dehydrated to yield the di-(alkylphenyl)-alkene as indicated schematically by the following equations which illustrate the synthesis of 1-p-tolyl-1-(2-methyl-5-isobutylphenyl)-2-methyl-1-propene.

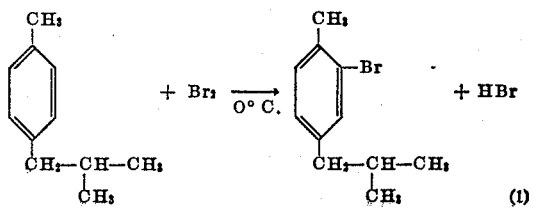

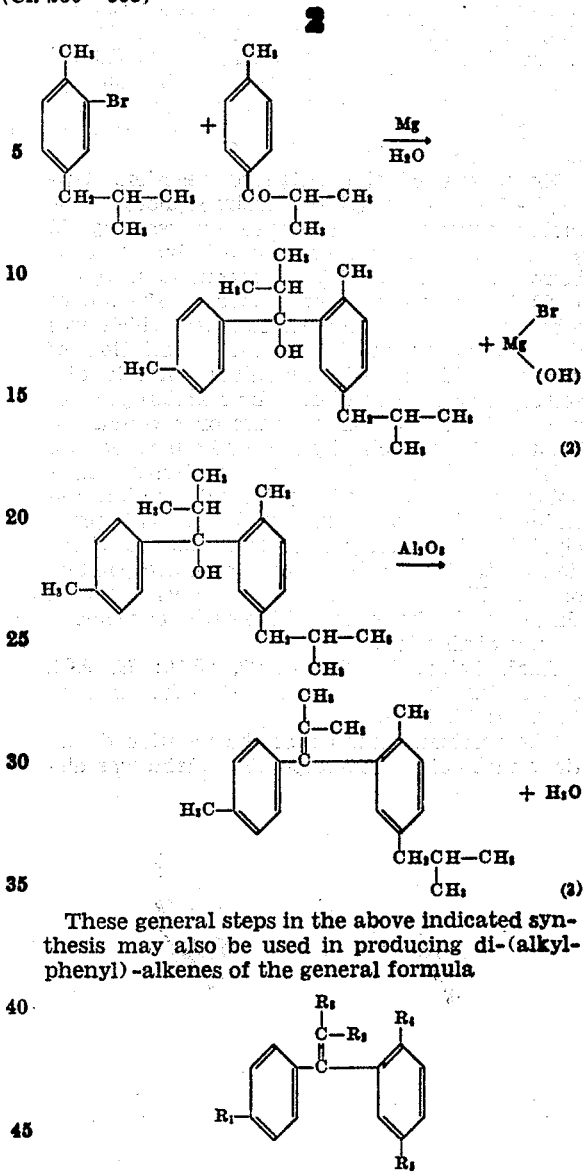

These general steps in the above indicated synthesis may also be used in producing di-(alkylphenyl)-alkenes of the general formula

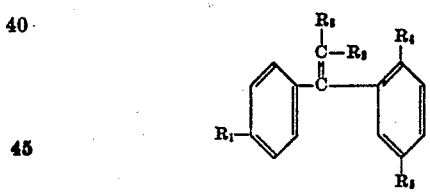

in which each of $R_1$, $R_2$, $R_3$, $R_4$ and $R_5$ separately and independently represents an alkyl group. A compound of this type may be referred to as 1-(4-alkylphenyl)-1-(2,5-dialkylphenyl)-2-alkyl-1-alkene.

The nature of the present invention is illustrated further by the following example which should not be misconstrued to limit unduly its generally broad scope.

1-p-tolyl-1-(2-methyl-5-isobutylphenyl)-2-methyl-1-propene was synthesized by the series of reactions represented by the foregoing Equations 1, 2, and 3. As the first step in this synthesis, 2-methyl-5-isobutylbromobenzene was prepared by reacting 49 grams (0.33 M.) of p-isobutyltoluene with 53 grams (0.33 M.) of bromine containing a trace of iodine (bromination catalyst) at a temperature of 0° C. The resultant brominated product was steam distilled, washed with dilute alkali and dried over calcium sulfate. The bromide distilled at 119–121° C. (12 mm.); $n_D^{20}$ 1.5308; $d_4^{20}$ 1.2057; yield 85%; $MR_D$ calcd. 57.2 obs. 58.8 (new compound).

Anal. Calcd. for $C_{11}H_{15}Br$: C, 58.14; H, 6.62; Br, 35.20. Found: C, 58.80; H, 6.77; Br, 34.68.

The position of the entering bromine atom was proved to be ortho to the methyl group by oxidation with nitric acid; 2 g. was refluxed for 48 hours with 10 ml. of nitric acid (1 vol. $H_2O$: 4 vol. 72% $HNO_3$). One gram of 3-bromo-4-methylbenzoic acid was formed, melting at 203–204° C., which agrees with the published melting point of this compound.

By means of the Grignard reaction, 1-p-tolyl-1-(2-methyl-5-isobutylphenyl)-2-methylpropanol was prepared by reacting 43 grams (0.19 M.) of 2-methyl-5-isobutylbromobenzene, 4.6 g. (0.19 M.) of magnesium, 31.0 g. (0.20 M.) of p-isobutyryltoluene in 120 ml. of ether to form a Grignard complex which was decomposed by pouring it over a solution of 14.5 g. (0.25 M.) of ammonium chloride dissolved in 25 ml. of water. The reaction product was distilled at 5 mm. pressure on a column of about 10–15 theoretical plates and separated into p-isobutyltoluene (10.3 g.); p-methyl-isobutyrophenon (16.0 g.) and a principal fraction distilling at 153–160°/4 mm. (25.5 g.). This principal fraction corresponded to a mixture of the desired tertiary carbinol and the corresponding olefin. The carbon-hydrogen analysis showed that partial dehydration of the carbinol occurred during distillation.

Anal. Calcd. for $C_{22}H_{30}O$: C, 85.16; H, 9.68. Calcd. for $C_{22}H_{28}$: C, 90.35; H, 9.65. Found: C, 88.47; H, 10.02.

The resultant mixture of the mentioned tertiary carbinol and corresponding olefin was dissolved in an equal volume of cyclohexane and the solution was passed over activated alumina at a temperature of 290° C. The theoretical amount of water was formed in this dehydration and the olefin so produced was distilled on a fractionating column having 10–15 plates efficiency. The olefin, namely, 1-p-tolyl-1-(2-methyl-5-isobutylphenyl)-2-methyl-1-propene which was obtained in an 85% yield boiled at a temperature of 145° C. at 3 mm. pressure, had a refractive index $n_D^{20}$ 1.5550, and a density $d_4^{20}$ of 0.9402, and a molecular refraction $MR_D$ calculated value of 96.1, observed value 99.7.

Anal. Calcd. for $C_{22}H_{28}$: C, 90.34; H, 9.66. Found: C, 89.90; H, 9.87.

We claim as our invention:

1. A di-(alkylphenyl)-alkene having the general formula

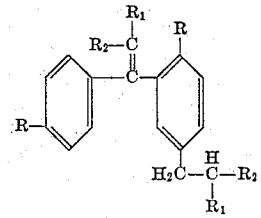

wherein R represents a straight chain alkyl group, and $R_1$ and $R_2$ are alkyl groups.

2. A 1-(4-alkylphenyl)-1-(2,5-dialkylphenyl)-2-alkyl-1-alkene in which the alkene group contains at least 3 carbon atoms.

3. 1-p-tolyl-1-(2-methyl-5-isobutylphenyl)-2-methyl-1-propene.

HERMAN PINES.
VLADIMIR N. IPATIEFF.

REFERENCES CITED

The following references are of record in the file of this patent:

UNITED STATES PATENTS

| Number | Name | Date |
| --- | --- | --- |
| 2,450,334 | Dixon et al. | Sept. 28, 1948 |